(12) United States Patent
Dorricott

(10) Patent No.: US 7,574,476 B2
(45) Date of Patent: Aug. 11, 2009

(54) FILTERING E-MAIL MESSAGES

(75) Inventor: Brian Dorricott, Clevedon (GB)

(73) Assignee: Gordano Limited, Clevedon (GB)

( * ) Notice: Subject to any disclaimer, the term of this patent is extended or adjusted under 35 U.S.C. 154(b) by 734 days.

(21) Appl. No.: 10/375,615

(22) Filed: Feb. 27, 2003

(65) Prior Publication Data

US 2003/0163540 A1 Aug. 28, 2003

(30) Foreign Application Priority Data

Feb. 27, 2002 (GB) ................. 0204589.6

(51) Int. Cl.
*G06F 15/16* (2006.01)
(52) U.S. Cl. ..................... 709/206
(58) Field of Classification Search ........ 709/206; 715/751–752
See application file for complete search history.

(56) References Cited

U.S. PATENT DOCUMENTS

| | | | | |
|---|---|---|---|---|
| 6,546,416 | B1* | 4/2003 | Kirsch | 709/206 |
| 6,574,658 | B1* | 6/2003 | Gabber et al. | 709/206 |
| 6,643,688 | B1* | 11/2003 | Fuisz | 709/206 |
| 6,973,481 | B2* | 12/2005 | MacIntosh et al. | 709/206 |
| 7,054,906 | B2* | 5/2006 | Levosky | 709/206 |
| 2002/0138581 | A1* | 9/2002 | MacIntosh et al. | 709/206 |

FOREIGN PATENT DOCUMENTS

| | | |
|---|---|---|
| WO | WO 99/10817 | 3/1999 |
| WO | WO 01/16695 A1 | 3/2001 |

OTHER PUBLICATIONS

United Kingdom Search Report for related Application No. GB 0204589.6; Report dated Jan. 29, 2003.

* cited by examiner

*Primary Examiner*—Andrew Caldwell
*Assistant Examiner*—Grant Ford
(74) *Attorney, Agent, or Firm*—Marshall, Gerstein & Borun LLP

(57) ABSTRACT

A method and system of filtering incoming email messages is provided which, on receipt of an incoming email, issues an email challenge to the sender of the received email requesting that they in turn send an email confirmation confirming that they are the sender of the originally received email, and in which received emails are then processed further according to whether or not they are occupied by a corresponding confirmation email. Senders that provide the requested email confirmation can be added to an approved list of senders such that subsequent emails received from them are not challenged again, whilst those emails to which an email confirmation is not received in response to the issued challenge can be deleted from the user's email system and the sender added to a blocked list of senders such that subsequent emails from a blocked sender are automatically ignored.

23 Claims, 2 Drawing Sheets

FILTERING E-MAIL MESSAGES

TECHNICAL FIELD

The disclosed system and method relates to the filtering of incoming e-mail messages.

BACKGROUND

Spam is the name given to unsolicited e-mail messages that are sent to people indiscriminately. These messages might also be inappropriate. For example, an e-mail message offering cheap contact lenses might be inappropriate if sent to people with unimpaired vision. A contact lens user could, however, consider the message to be of value, even though it was unsolicited. This example illustrates a major issue with such e-mail; only the recipient of a message can truly decide whether it is spam or not.

Filters are known to check e-mails for spam using several techniques including conventional filters, compliance checking and traffic anomaly detection. For example, filters include software that looks for key words (e.g. XXX, sex, etc.). When a keyword is found the e-mail message is rejected. With compliance checking, a considerable number of tools used by spammers generate "non-compliant" e-mail messages. These can be identified and ignored. Traffic anomaly detection involves monitoring where e-mail messages come from and go to, which helps to detect unusual patterns of e-mail that are often associated with mass mailings. Software can be configured to take action when specific limits are reached. All of these known filters have several problems including maintenance and false positives. Maintaining a word list for filters can become a full time job for the systems administrator. A false positive occurs when a normal, legitimate message is incorrectly identified as spam. Filtering on a keyword such as "breast" will catch all discussions on "breasts" including those concerning say, cancer treatment.

DETAILED DESCRIPTION OF EMBODIMENTS OF THE INVENTION

The disclosed system and method includes an improved filtering technique for incoming e-mails in which, on receiving an e-mail, an e-mail challenge is sent to the sender of the e-mail requesting that they send an e-mail confirmation that they are the sender of the original e-mail, and in which received e-mails are then processed further according to whether or not they are accompanied by a corresponding confirmation e-mail. Optionally, the disclosed system and method allows for a time period to be set in which the validation e-mail must be sent. If the validation is not received, the message and record of the address will be deleted. If a valid confirmation is received then the address can be flagged as a permanently acceptable address.

This filtering technique is easy to understand and easy to use. Further, this technique saves time by removing the need for users to review spam thereby increasing the time available to handle legitimate e-mail. The number of false positives are also reduced. Users no longer need to review their in-box when deleting spam. This dramatically reduces the likelihood that they delete legitimate e-mail accidentally.

The disclosed system and method can be used with any mail client. The confirmation process can be used irrespective of mailbox access method. If a mail server is also configured for POP3/IMAP using, say GLMail, then with any POP3 or IMAP4 mail client (e.g. Microsoft Outlook, Microsoft Outlook Express, Qualcom's Eudora, etc.) can be used in addition to the server HTTP client. Further, there is low management overhead. The system administrator does not have to make changes to the system set up for each user. Each user can choose their own individual settings. Accidental "leakage" of a user's e-mail address is also limited.

Commonly SPAM is sent from addresses that are unable to receive e-mail, either because of an invalid reply address or by deliberately disabling the account. Such addresses will be caught by the disclosed system and method with no user action required.

Confirmation is an additional stage in the mail handling process that requires the original sender of a message to take some action when first communicating. This action "verifies" that the sender exists and intended the message to be sent.

Once the sender has returned the verification, the original message is delivered as usual. The recipient can elect to have the sender's e-mail address automatically added to their address book, so the next time a message is received from them the confirmation is not activated. This means that the sender has to go through the process only once.

While messages are waiting confirmation, they are held in a "Quarantine" folder that may be accessed by the recipient at any time. Old messages are removed automatically from the Quarantine folder after a number of days defined by the user. If a message is removed from Quarantine without a confirmation having been received then the e-mail address can be blocked.

Figure 1:
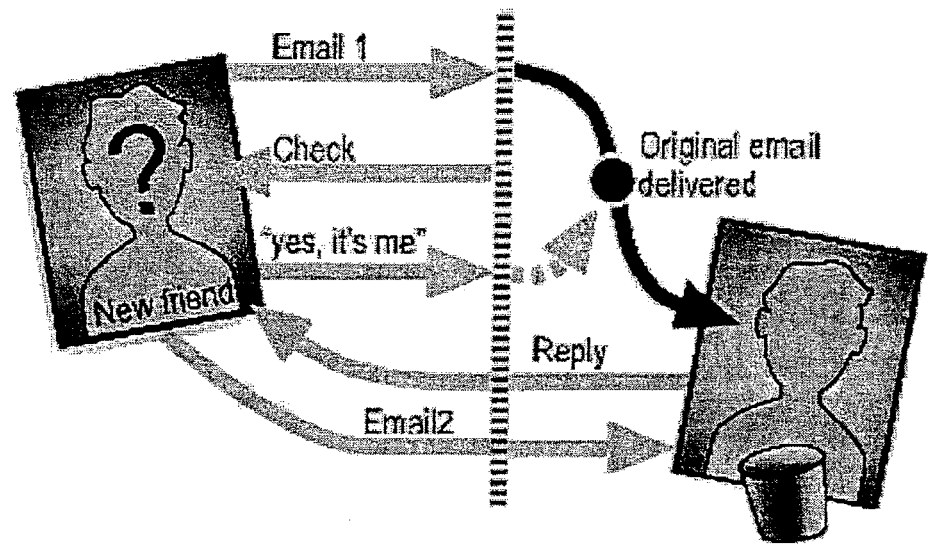
FIG. 1 is a diagram illustrating e-mail communications between Martin and Joe, a new correspondent according to an example of the disclosed system and method.

As an example, consider Martin and a new correspondent, Joe. Martin has just switched on confirmation for the first time. Having previously exchanged e-mail addresses with Joe at a recent conference, Joe now e-mails him for the first time (e-mail 1 FIG. 1). On receipt at Martin's server, Joe's e-mail was diverted into the "Quarantine" folder. Joe is then immediately sent an automatically generated e-mail from Martin's system (check). The e-mail may look like this:

Hi!

Many thanks for your e-mail. Please reply to this message.

Martin

To explain: I have set up an anti-spam filter which asks for a confirmation from you that you intended to e-mail me. When you reply, the message will be delivered to me as usual and I can read it. You will only have to do this once.

In order for your message to be delivered to martin@dance.org.uk, please reply to this message, leaving the following lines intact.

---start token:3c89cb835b4a941836b94bd6841f60d5:IoZ7J)Sd

---end

On receipt, Joe simply replies to the message ("yes, it's me") and does not have to type anything into the body of the message.

The reply arrives at Martin's account where the confirmation process identifies the "token" and automatically transfers Joe's e-mail into Martin's "In-Box". Martin can now reply to Joe in the usual way (reply, e-mail2, etc.). The token may be in the body, subject or in part of the return address.

Figure 3:
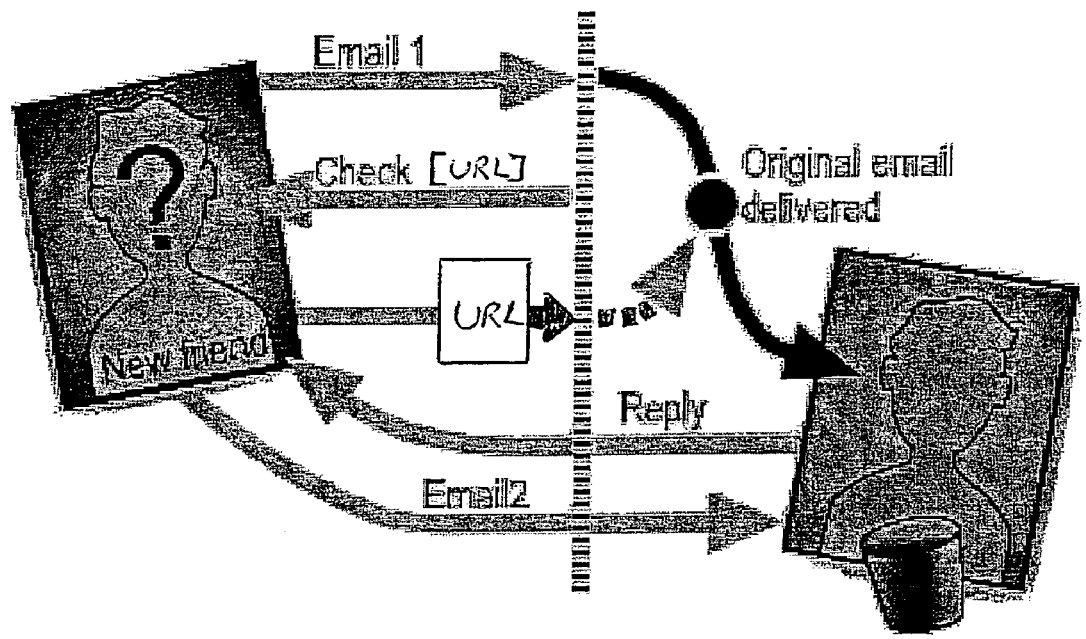
FIG. 3 is a diagram illustrating e-mail communications according to an example of the disclosed system and method.

In an alternative example, illustrated in FIG. 3, the e-mail challenge sent by Martin requests that the recipient, in this case Joe, responds by selecting a unique URL (website) to confirm that they are the sender of the originally received e-mail. By selecting the URL the 'token' embedded in the e-mail challenge is automatically passed, together with Joe's e-mail details, to the URL host and from there to Martin's server. This is accomplished by conventional means, such as Java applets.

In a further example, the e-mail challenge is sent from a unique e-mail address to which a response must be sent to avoid rejection of the original message. Each message that is received by Martin's e-mail server from a previously unknown source causes a new e-mail account to be generated from which the challenge e-mail is sent. Optionally, the unique e-mail addresses may be arranged to expire after a certain period of time. In either case it is not necessary, although it is not precluded either, to include an identifying token in the e-mail challenge as any reply to the unique e-mail address must have been sent from the original sender, i.e. Joe, as only they have been provided with the unique e-mail address.

There are several choices that Martin has about the way he can use the confirmation process. For example, at any time, Martin can check the "special" folder called "Quarantine". This folder contains all the messages waiting for the confirmation response from the sender. After a chosen number of days, messages are removed from the folder automatically. When messages are removed, the sender's e-mail address can be added to the "block list" so messages from this person are never accepted again. Martin can also choose to block, accept or delete any messages at any time at his discretion. Additionally, Martin can edit the confirmation message so he can provide a personal response in his own language and style.

If desired, addresses can be confirmed only once. Confirmation messages are only sent to those people who do not have an entry in Martin's address book. Martin could add e-mail addresses to the address book manually. To ease management, Martin can decide how which addresses are added automatically. For example, every address Martin e-mails can be placed into the address book and/or the address of anyone who goes through the confirmation process. This means that the confirmation does not affect those people that Martin already communicates with. Martin can also decide to clear his address book at any time, thus forcing a reconfirmation in the future.

Figure 2:
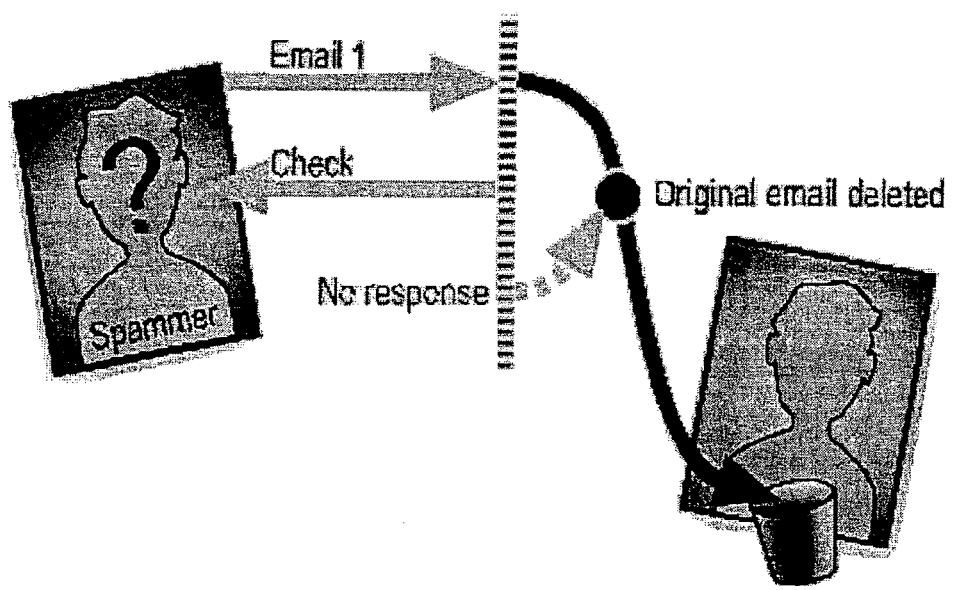
FIG. 2 is a diagram illustrating e-mail communications between Martin and Sam the spammer according to an example of the disclosed system and method.

Consider now the example of Sam, the spammer. Sam has just put together a mail shot to 10,000,000 people (e-mail 1 in FIG. 2). In the past, Martin's in-box would have received an e-mail containing yet another "get rich quick" idea. Now, with the confirmation process switched on, he is going to be spared from the hassle.

When Martin's system receives the message from Sam, it does not find a corresponding address book entry and so sends a confirmation message to the address in the e-mail message (check). One of two things is now likely to happen, depending upon how Sam sent his spam.

Most spam is sent from accounts that do not exist. In this case, the mail system will return a message (possibly from the "postmaster") saying that the account is not available. Since the details of this message do not match Sam's original message, the confirmation process is activated again and both messages reside in the Quarantine folder. Eventually, the messages will be deleted and the spam never reaches Martin's in-box.

If Sam sent the message from his own account he will need to personally reply to the message in order for it to be delivered to Martin. For a large number of responses, this is clearly not worth the spammer's time.

The confirmation process can be used with Microsoft Outlook, Eudora, Pegasus, etc. The Confirmation process works on the server by holding messages in a special "Quarantine" folder and then transferring it to the standard "In-Box" once a confirmation has been received. If the mail server is equipped with a suitable complement, such as GLMail or NTMail, then any mail client that can use POP3 or IMAP4 can subsequently obtain the message in the usual way. Further, those people using an IMAP4 client can also review messages that appear in the Quarantine folder. Each user need only log on GLWebMail XT once to set up their confirmation options and retains the option to access their mailbox via the inbuilt GLWebMailXT client at any time.

False positives are only likely to occur if the original sender (in this case Joe) never replies to the confirmation message and even then, only if it is the first ever communication. In this case, Martin is likely to know about the e-mail message through other means (e.g. because they met at the conference) and can simply check the Quarantine folder.

Experience has shown that confirmation actually reduces the number of false positives. When users receive a large number of spam messages (e.g. five or ten each day), they tend to simply press the "delete" button to delete anything that looks like spam. This may lead to legitimate messages being deleted carelessly or accidentally.

For example, Martin might have sent a payment for some new software. The company sends the key via e-mail with a subject title of "Amazing Slow Downer for Windows" from an addressee of "Bernadette". Since Martin doesn't recognise the name, he simply deletes the e-mail. A couple of weeks later, he rings up to find out what happened to his software!

Figure 4:
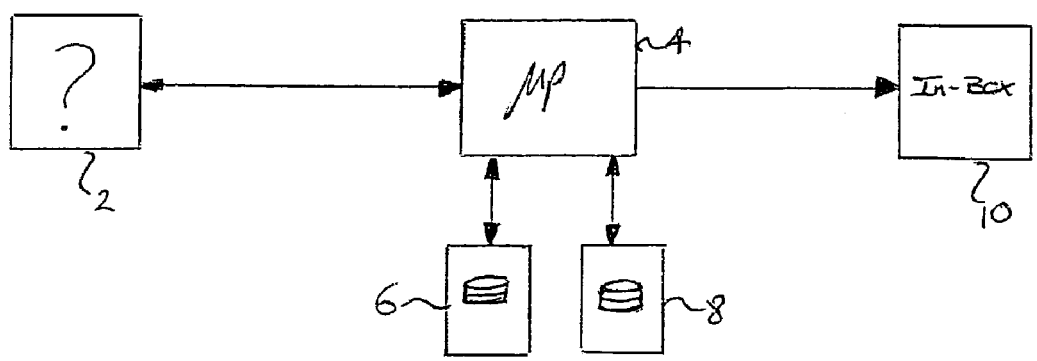
FIG. 4 is a diagram illustrating an e-mail system according to an example of the disclosed system and method.

FIG. 4 illustrates schematically an e-mail system according to an example of the disclosed system and method. The new friend or potential spammer 2 is shown in communication with a data processor 4 that is resident in the e-mail system. The data processor 4 is in communication with two data storage areas. The first data storage area 6 stores a list of approved senders, whilst the second data storage area 8 stores a list of blocked senders. The data processor 4 is arranged to access the first and second data storage areas in response to receiving an e-mail from the sender 2 as part of the process, as described hereinbefore, of determining how to process the received e-mail. Cleared e-mails are displayed in a conventional manner in a system in Box 10.

Although preferred examples have been disclosed for illustrative purposes, those of ordinary skill in the art will appreciate that the scope of this patent is not limited thereto. On the contrary, this patent covers all systems and methods falling within the scope and spirit of the accompanying claims.

What is claimed is:

1. A method of filtering incoming e-mails, the method comprising:
    on receipt of a first e-mail from a sender, creating a unique e-mail address and sending an e-mail challenge from the unique e-mail address to the sender requesting that they provide an e-mail confirmation that they are the sender of the first e-mail; and
    automatically processing the first e-mail in accordance to whether or not the confirmation is received.

2. A method according to claim 1 further comprising forwarding the first e-mail to a specified recipient if the confirmation is received.

3. A method according to claim 1 further comprising:
comparing the sender to a list of one or more approved senders; and
directly processing the e-mail without sending an e-mail challenge if the sender is an approved sender.

4. A method according to claim 1 further comprising storing the first e-mail in an allocated storage location whilst receipt of the confirmation is awaited.

5. A method according to claim 1, wherein the confirmation comprises an e-mail reply to the e-mail challenge.

6. A method according to claim 1 further comprising accepting the confirmation only if it is sent to the unique e-mail address.

7. A method according to claim 1, wherein the e-mail challenge comprises an invitation to select a unique network address, the method further comprising providing the confirmation by the sender of the first e-mail selecting the unique network address.

8. A computer program product comprising a plurality of program code instructions, which when run on a computer cause the computer to execute the method of claim 1.

9. A method according to claim 1, wherein the unique e-mail address expires a predetermined time period after being created.

10. A method according to claim 3 further comprising adding the sender of the confirmation to the list of approved senders upon receipt of the confirmation.

11. A method according to claim 4 further comprising removing the first e-mail in the allocated storage location at a predetermined period of time after their receipt.

12. A method according to claim 5, wherein the e-mail challenge comprises an identifying token.

13. A method according to claim 7, wherein the e-mail challenge includes an identifying token, the method further comprising transmitting the identifying token to the unique network address when it is selected.

14. A method according to claim 11 further comprising adding the sender of the first e-mail removed from the allocated storage location on expiry of the predetermined time period to a blocked senders list.

15. A method according to claim 12 further comprising accepting the confirmation only if it comprises the identifying token.

16. A method according to claim 13 further comprising accepting the confirmation if the identifying token is provided.

17. A method according to claim 14 further comprising refusing e-mails from senders on the blocked senders list.

18. An e-mail system for filtering incoming e-mails, the e-mail system comprising a data processor arranged to generate a unique e-mail address in response to receipt of a first e-mail and to issue an e-mail challenge to the sender of the first e-mail, the e-mail challenge requesting confirmation from the e-mail sender that they are the sender of the first e-mail, and arranged to further process the first e-mail in accordance with whether or not the confirmation is received, wherein the data processor is further arranged to send the e-mail challenge to the sender from the unique e-mail address.

19. An e-mail system according to claim 18, further comprising an approved sender store arranged to store a list of approved senders and wherein the data processor is arranged to compare the sender of a received e-mail with the list and, where a match is made between the sender and the list, directly process the received e-mail without issuing an e-mail challenge.

20. An e-mail system according to claim 18, further comprising a stored blocked senders list and wherein the data processor is arranged to compare the sender of an e-mail with the blocked senders list and to not accept the e-mail if a match is made.

21. An e-mail system according to claim 18, wherein the data processor is arranged to accept a confirmation only if it is sent to send unique e-mail address.

22. An e-mail system according to claim 18, wherein the data processor is further arranged to mark the unique e-mail address as expired a predetermined time period after generating the unique e-mail address.

23. An e-mail system according to claim 19, wherein the data processor is further arranged to add a sender to the list of approved senders on receipt of a confirmation from the sender.

* * * * *